United States Patent [19]

Nagano

[11] Patent Number: 5,522,282
[45] Date of Patent: Jun. 4, 1996

[54] CONNECTING STRUCTURE BETWEEN BICYCLE PEDAL AND CLEAT, BICYCLE PEDAL AND CLEAT

[75] Inventor: Masashi Nagano, Izumi, Japan

[73] Assignee: Shimano Inc., Osaka, Japan

[21] Appl. No.: 971,269

[22] Filed: Nov. 4, 1992

Related U.S. Application Data

[63] Continuation of Ser. No. 611,504, Nov. 13, 1990, abandoned.

[30] Foreign Application Priority Data

| Nov. 14, 1989 | [JP] | Japan | 1-296415 |
| Nov. 16, 1989 | [JP] | Japan | 1-297860 |
| Nov. 16, 1989 | [JP] | Japan | 1-297861 |
| Nov. 22, 1989 | [JP] | Japan | 1-135980 U |

[51] Int. Cl.$^6$ .................................................. G05G 1/14
[52] U.S. Cl. ........................ 74/594.6; 74/594.4; 36/131
[58] Field of Search ........................... 74/594.4, 594.6; 36/131, 132

[56] References Cited

U.S. PATENT DOCUMENTS

| 4,089,236 | 5/1978 | Genzling | 74/594.6 |
| 4,302,987 | 12/1981 | Takeda | 74/594.6 |
| 4,686,867 | 8/1987 | Bernard et al. | 74/594.6 |
| 4,932,287 | 6/1990 | Ramos | 74/594.6 |
| 5,003,841 | 4/1991 | Nagano | 74/594.4 |
| 5,046,382 | 9/1991 | Steinberg | 36/131 X |

FOREIGN PATENT DOCUMENTS

| 146454 | 6/1985 | European Pat. Off. | 074/594.6 |
| 146218 | 6/1985 | European Pat. Off. | 074/594.6 |
| 0146454 | 7/1985 | European Pat. Off. | 074/594.6 |
| 0372165 | 6/1990 | European Pat. Off. | 074/594.6 |
| 2442175 | 10/1982 | France | 074/594.6 |
| 2609270 | 7/1988 | France | 074/594.6 |
| 2620409 | 3/1989 | France | 074/594.6 |
| 3937358 | 5/1990 | Germany | 036/131 |
| 3924601 | 1/1991 | Germany | 036/131 |
| 2239780 | 7/1991 | United Kingdom | 036/131 |

OTHER PUBLICATIONS

Japanese Patent Abstract No. 03–34987 published on Apr. 5, 1991.

*Primary Examiner*—Vinh T. Luong
*Attorney, Agent, or Firm*—Dickstein, Shapiro & Morin

[57] ABSTRACT

A connecting structure between a bicycle pedal and a cleat is formed of hooks pivotably supported by a pedal body for engaging and releasing the cleat, and an urging device for urging the hooks toward engaging positions. A first cam mechanism is provided between each of the hooks and the cleat for causing the hook to pivot in a releasing direction when the cleat is inclined about a first imaginary axis extending substantially along a direction of pivotal movement of the hooks. The first cam mechanism includes a first pressed edge defined on one of the hooks and opposed to the cleat, and a first pressing edge defined on the cleat and opposed to one of the hooks for slidable contact with the first pressed edge. The first pressed edge and first pressing edge overlap each other as seen in a direction perpendicular to the pedal body tread.

9 Claims, 10 Drawing Sheets

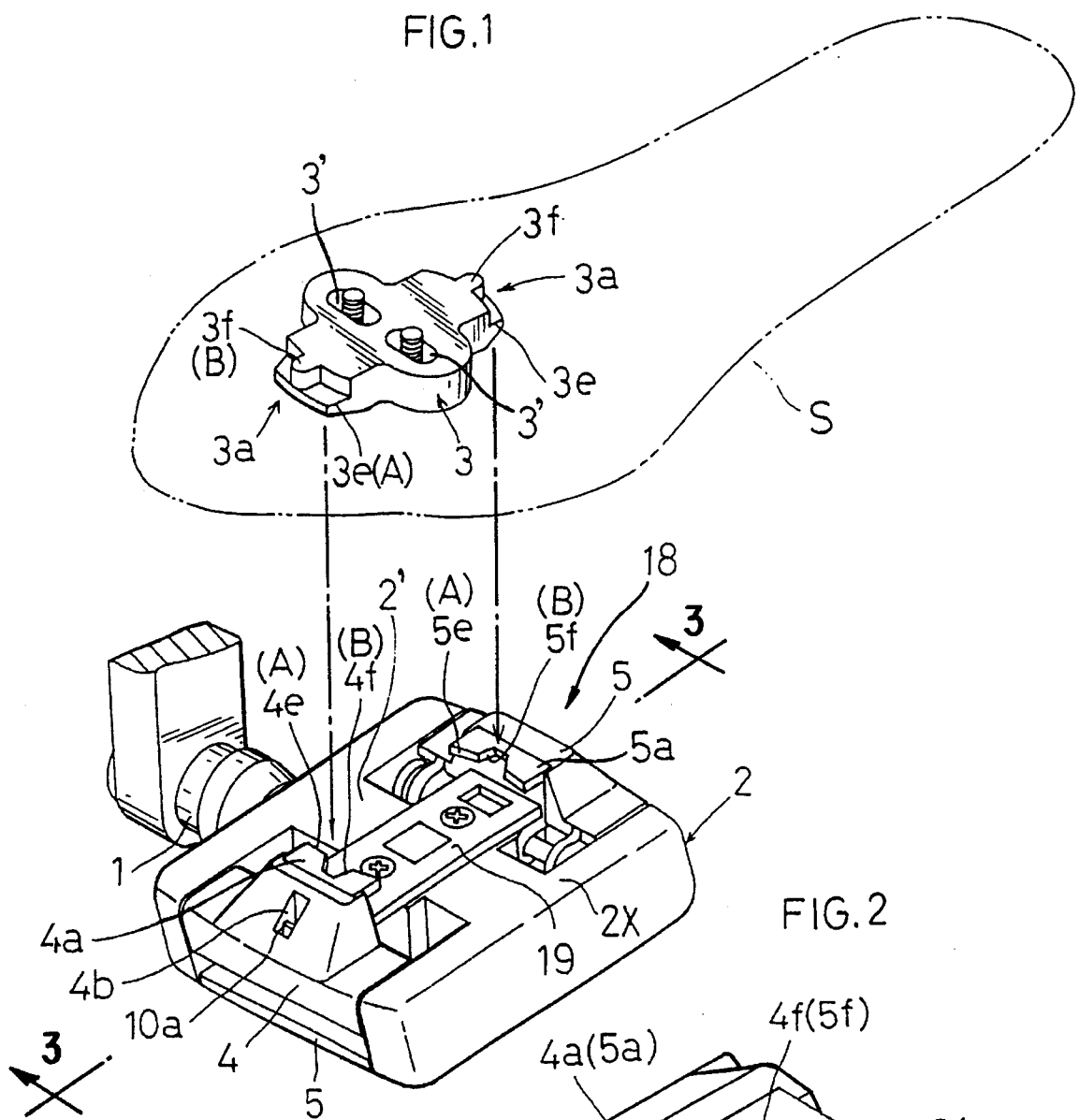
FIG.1
FIG.2
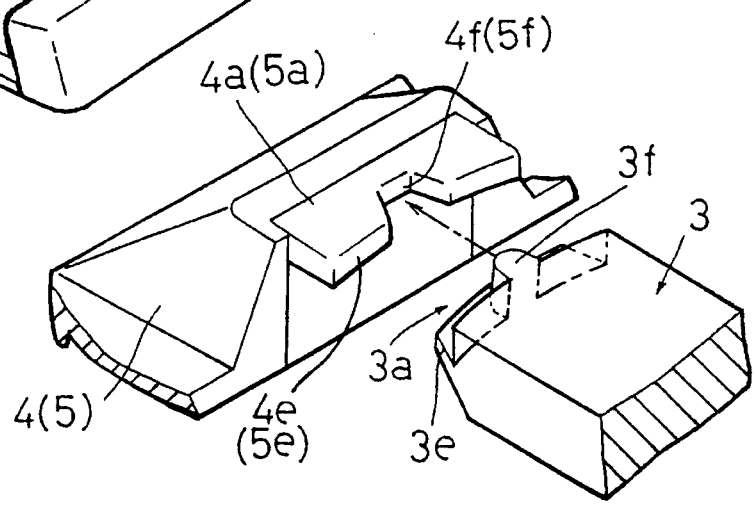

CONNECTING STRUCTURE BETWEEN BICYCLE PEDAL AND CLEAT, BICYCLE PEDAL AND CLEAT

This application is a continuation of application Ser. No. 07/611,504 filed Nov. 13, 1990, now abandoned.

BACKGROUND OF THE INVENTION

1. Field of the Invention

The present invention relates to a structure for fixing a shoe to a bicycle pedal through a cleat attached to the bottom of the shoe.

2. Description of the Prior Art

FIGS. 19 and 20 show a known structure for fixing a shoe to a bicycle pedal through a cleat attached to the bottom of the shoe. Generally, a pedal shaft 43 rotatably supports a pedal body 44 including a front hook 44a formed on a front end thereof and having an engaging portion having approximately the same width as a front engaging portion of a cleat 45. The pedal body 44 also includes a rear hook claw 41 connected to a rear end thereof to be pivotable between an engaging position and a disengaging position. The rear hook claw 41 includes a cleat contacting portion 41a and a cleat engaging portion 41b extending axially of the pedal body 44. A spring 42 is mounted between the rear hook 41 and pedal body 44 to urge the rear hook claw 41 forwardly toward the engaging position. The cleat 45 includes a recessed engaging portion 45a at a rear end thereof for fitting engagement with the rear hook 41. Such a known structure is disclosed in the Japanese patent application laid open under No. 60-197478, for example.

When attaching the shoe to the pedal through the cleat 45, the cyclist moves the shoe obliquely downwardly and forwardly relative to the pedal body 44. After the front end of the cleat 45 is engaged by the Front hook 41a of the pedal body 44, the cyclist places the rear end of the cleat 45 in contact with a guide portion of the rear hook 41. In this state, the shoe is pressed down, which causes the rear hook 41 to pivot rearwardly to the disengaging position against the force of spring 42. The rear end of the cleat 45 enters a position opposite a back Face of the rear hook 41. Then, the rear hook 41 returns under the Force of spring 42 and engages the rear end of the cleat 48. This engagement fixes the shoe to the pedal through the cleat 45.

When releasing the shoe from the fixed state, the cyclist turns the shoe about an axis perpendicular or approximately perpendicular to treads of the pedal, using the front end of the cleat 45 as a pivotal point. As a result of this pivotal movement, the rear hook 41 moves From a recess D defining the engaging portion 45a and mounts an adjacent non-recessed portion E. This causes the rear hook 41 to pivot rearwardly to the disengaging position against the force of spring 42, thereby releasing the shoe.

However, according to the known construction noted above, the shoe is releasable from the pedal only by turning the shoe about an imaginary axis perpendicular or approximately perpendicular to the treads of the pedal, using the front end of the cleat 45 as a pivotal point. With the known construction, therefore, the shoe may not be released from the pedal when, for example, the cyclist falls over to the ground and tilts the shoe sideways relative to the pedal treads.

Further, the rigid connection between the shoe and bicycle pedal, according to the prior art as noted above, applies a treading force of the cyclist to the pedal effectively and reliably. On the other hand, in the case of a mountain bike which runs rough terrains, such a connection transmits violent vibrations resulting from the roughness of the terrain to the cyclist's foot. The known connecting structure between the bicycle pedal and cleat includes engaging members attached to the pedal shaft for connection to the shoe, and the shoe rests on the pedal through the engaging members. Moreover, such engaging members are generally formed of a highly rigid material to assure a strong connection to the shoe. Thus, the vibrations due to the roughness of the terrain are transmitted directly to the cyclist's foot without being damped, thereby straining the cyclist's foot.

Even in an ordinary run of the bicycle, the torsional force about the imaginary axis noted above may be applied to the shoe connected to the pedal body. When cornering on a mountain bike, for example, the cyclist may pedal the bike with only one foot in an unstable posture. To maintain his balance in such a condition, the cyclist turns the pedal body while applying a torsional force about the above-mentioned imaginary axis to the shoe connected to the pedal body. Further, when the cyclist pedals the bicycle without being seated on the saddle, the unstable posture could result in an inadvertent application of a torsional force about the imaginary axis to the shoe connected to the pedal body. According to the known structure noted above, the shoe could inadvertently disengage from the pedal body under the torsional force applied to the shoe connected to the pedal body. The cyclist faces a serious danger as a result of the shoe disengaging from the pedal body while the cyclist is in such an unstable posture. To prevent the shoe from inadvertently disengaging from the pedal body, it is conceivable to set the torsional force for turning the shoe about the imaginary axis to a high level. However, such a measure would be inappropriate since the shoe would not readily be released from the pedal body in an emergency, such as when the cyclist falls over.

However, according to the known structure noted above, the shoe must be turned a great extent about the imaginary axis to become disengaged from the pedal body. In an emergency such as when the cyclist turns over, the shoe turned a small amount only results re-engagement between the cleat and engaging members. The cyclist could be seriously injured with the shoe remaining caught with the pedal body.

SUMMARY OF THE INVENTION

The present invention has been made having regard to the state of the art noted above. A first object of the invention, therefore, is to provide a connecting structure which releases the cleat with increased reliability when, for example, the cyclist falls over with his shoe inclined relative to the pedal.

A second object of the present invention is to provide a connecting structure which reduces the strain of the cyclist's foot.

A third object of the invention is to provide a connecting structure which reliably connects the cleat to the pedal body during a normal run, and allows the cleat to be released from the pedal body in an emergency.

The first object above is fulfilled, according to a first aspect of the present invention, by a connecting structure comprising hooks pivotably supported by a pedal body for engaging and releasing the cleat; an urging device for urging the hooks toward engaging positions; and a first cam mechanism provided between each of the hooks and the cleat for causing the hook to pivot in a releasing direction when the cleat is inclined about a first imaginary axis extending substantially along a direction of pivotal movement of the hooks, the first cam mechanism including a first pressed edge defined on one of the hooks and opposed to the cleat, and a first pressing edge defined on the cleat and opposed to one of the hooks for slidable contact with the first pressed edge, the first pressed edge and the first pressing edge overlapping each other as seen in a direction perpendicular to a tread of the pedal body.

In the above connecting structure, the first pressed edge and first pressing edge constituting the first cam mechanism overlap each other as seen in the direction perpendicular to a tread of the pedal body. Therefore, the hook pivots when the cleat is inclined about the first imaginary axis extending along the direction of pivotal movement of the hook. The first cam mechanism, with the inclination of the cleat, causes the hook to pivot in the release direction. So the shoe becomes disengaged from the pedal when the shoe to which the cleat is fixed is twisted to incline the cleat.

Thus, the shoe is released from the pedal even when the shoe is inclined with the foot in an emergency such as falling over of the cyclist. This helps to avoid a danger of spraining or fracturing the foot for promotion of the safety aspect.

The above connecting structure may further comprise a second cam mechanism provided between each of the hooks and the cleat for causing the hook to pivot in the releasing direction when the cleat is inclined about a second imaginary axis extending substantially perpendicular to a tread of the pedal body, the second cam mechanism including a second pressed edge defined on one of the hooks and opposed to the cleat, and a second pressing edge defined on the cleat and opposed to one of the hooks for slidable contact with the second pressed edge, the second pressed edge of the hook lying in a locus described by the second pressing edge of the cleat when the cleat is swung.

According to this construction, the hook will pivot with a swinging movement of the cleat since the second cam mechanism is provided which includes a second pressed edge defined on the hook and opposed to the cleat, and a second pressing edge defined on the cleat and opposed to the hook for slidable contact with the second pressed edge, with the second pressed edge of the hook lying in a locus described by the second pressing edge of the cleat when the cleat is swung. The second cam mechanism, with a swing of the cleat, causes the hook to pivot in the release direction. So the shoe becomes disengaged from the pedal when the shoe to which the cleat is fixed is twisted to incline the cleat. Furthermore, since the first imaginary axis and second imaginary axis extend in different directions, the shoe is positively disengaged from the pedal when the cleat is twisted in two or more directions. This construction further promotes safety in that the shoe is releasable from the pedal not only with an inclination of the cleat as noted above but with a swinging movement of the cleat.

The construction may be simple and easy to manufacture if the first pressing edge and second pressing edge comprise a common pressing edge formed on the cleat. In a preferred embodiment of the invention, the first pressing edges comprise opposite side edges of a portion engaged by the hook, and converge toward the hook. This construction assures a smooth pivotal movement of the hook in the release direction whichever direction the cleat may be inclined about the first imaginary axis.

The second object noted hereinbefore is fulfilled, according to a second aspect of the present invention, by a connecting structure in which the pedal body includes a shoe rest for receiving a shoe bottom, the shoe rest at least partly surrounding an engaging device including the hooks and the urging means, and the shoe bottom includes a contact portion at least partly surrounding the cleat for contacting the shoe rest.

According to this construction, the cyclist's shoe not only is placed on the pedal indirectly through the engaging device but has the contact portion thereof directly placed on the shoe rest formed around the engaging device. On the one hand, the shoe is rigidly connected to the pedal through the cleat and engaging device to transmit part of a treading force of the cyclist directly to the shoe rest. On the other hand, vibrations transmitted from the pedal to the cyclist's foot are damped between the shoe rest and the shoe bottom by utilizing an elastic material of which the shoe bottom is usually formed. In other words, in the known connecting structure between the bicycle pedal and cleat, the engaging device on the pedal acts both to connect the shoe to the pedal and to receive the treading force of the cyclist. In the prior art, therefore, the shoe rests on the engaging device itself which has a relatively large area. By contrast, the connecting structure of this invention has the engaging device acting mainly as a connector for the shoe, the function to receive the treading force of the cyclist being fulfilled also by the shoe rest effective to damp the vibrations in combination with the shoe bottom. This reduces the vibrations transmitted through the engaging device to the cyclist's foot without being damped.

According to the second aspect of the invention, therefore, when running on a very rough terrain, part of the vibrations resulting from the rough ground are damped by the elasticity or the shoe bottom for transmission to the cyclist's foot. This connecting structure reduces the strain of the cyclist's foot, and greatly relieves the cyclist from fatigue particularly in rough road conditions or during a long distance run. A mountain bike must often run in rough ground conditions, and the cyclist must from time to time dismount the bike for crossing places impossible to ride through. The connecting structure of this invention is extremely useful for such situations in that the cleat is readily releasable from the pedal and that the cyclist is well protected from fatigue.

The third object noted hereinbefore is fulfilled, according to a third aspect of the present invention, by a connecting structure in which the pedal body includes rotation restrictors for contacting the cleat engaged by the hooks to restrain the cleat from rotating about the second imaginary axis, cam surfaces being defined on the rotation restrictors and/or the cleat for moving the cleat away from the tread of the pedal body when the cleat engaged by the hooks is rotated about the second imaginary axis.

According to the third aspect of the invention, the rotation restrictors basically restrain the cleat in the engaged state from rotating about the above imaginary axis. The cam surfaces defined on the rotation restrictors or the cleat provide the option, as described hereunder, for the cleat to rotate or not to rotate about the imaginary axis, and hence the option for the cleat to disengage or not to disengage from the pedal body. During a normal run a great treading force is applied to the shoe to tread and turn the pedal body. This treading force is maintained during the normal run unless the shoe is intentionally lifted. Such treading force operates through the inclination of the cam surfaces to prevent the cleat from leaving the tread of the pedal body. That is, the cleat in the engaged state cannot rotate without moving away from the tread. As a result, the function of the cam surfaces is nullified and the rotation of the cleat about the above-mentioned imaginary axis is effectively restrained by the rotation restrictors. For this reason, even if a torsional force around the imaginary axis is applied to the cleat engaged by the pedal body, the cleat will not rotate about the imaginary axis to oscillate the hooks. Since the cleat remains engaged by the hooks, the cleat will never inadvertently become separated from the cleat. On the other hand, in an emergency such as when the cyclist falls over, the cleat may move away from the tread owing to the inclination of the cam surfaces since tile treading force acting on the pedal body is at least temporarily removed. Thus, the rotation of the cleat about the second imaginary axis is not in any way prevented by the presence of the rotation restrictors. The cleat, by its rotation, is disengageable from the hooks to separate from the pedal body. The cleat becomes disengaged from and moves away from the hooks, so that inadvertent reengagement between the cleat and hooks is positively avoided. The cleat is reliably separable from the pedal body for the same reason also when the cleat is rotated about the imaginary axis without a treading force applied intentionally. This promotes safety of the cyclist during a run while allowing the cyclist to turn the pedal body with full force despite an unstable posture such as in cornering.

According to the first aspect of the present invention, where the hooks are provided at the front end of the pedal body as well as the rear end thereof, a great pressure applied forwardly of the pedal could result in disengagement between the front hook and the cleat, whereby the cleat inadvertently becomes disengaged from the pedal.

Having regard to the above situation, a connecting structure according to a fourth aspect of the present invention comprises a pedal body further including forward movement stoppers for contacting the cleat engaged by the hooks to prevent movement of the cleat forwardly of the pedal and allow rotation of the cleat about the second imaginary axis.

In this construction, the forward movement stoppers are effective to prevent the front hook from pivoting forwardly of the pedal body when a great forward pressure acts on the front hook. The cleat in the engaged state will not move away from the tread of the pedal, and therefore will not move over the forward movement stoppers. Thus, when a great pressure acts on the cleat such as when the cyclist pedals the bicycle with full force or suddenly applies brakes, the front hook is free from the pressure and the cleat remains engaged without allowing the shoe to inadvertently separate from the pedal. The connecting structure including the forward movement stoppers realizes optimal hooks for allowing the cleat to be engaged by the pedal through a treading operation relative to the pedal. This is possible because no means is necessary for retarding the forward pivotal movement of the front hook. In addition, the forward movement stoppers allow the cleat to rotate about the second imaginary axis. Thus, the cleat may be rotated to readily disengage from the pedal.

In the fourth aspect of the invention, the cleat separation may be further facilitated if the rear end of the cleat, which may be rotated or swung most easily from the point of view of human engineering, is rotatable about the second imaginary axis.

Other objects, features and advantages of the present invention will be apparent from the following description.

BRIEF DESCRIPTION OF THE DRAWINGS

FIGS. 1 through 8 show a first embodiment of the present invention, in which:

FIG. 1 is a perspective view of a connecting structure,

FIG. 2 is a perspective view of a principal portion of the connecting structure seen from a different angle, FIG. 3 is a view in vertical section of the connecting structure, taken along the line 3—3 of FIG. 1, FIGS. 4 through 6 are plan views for illustrating the way in which the connecting structure operates, FIG. 7 is a rear view, partly broken away, of the connecting structure seen in a direction perpendicular to a pedal shaft, and FIG. 8 is a plan view showing a relationship between the connecting structure and a cleat.

FIGS. 9 through 13 show a second embodiment of the present invention, in which:

FIG. 9 is a perspective view showing a relationship between a cleat and a pedal, FIGS. 10 and 11 are sectional views showing a relationship between the rear end of the cleat and a rotation restricting portion, and FIGS. 12 and 13 are schematic plan views showing the relationship between the rear end of the cleat and the rotation restricting portion.

DESCRIPTION OF THE PREFERRED EMBODIMENTS

A first embodiment of the present invention will be described with reference to FIGS. 1 through 8.

Figure 3:
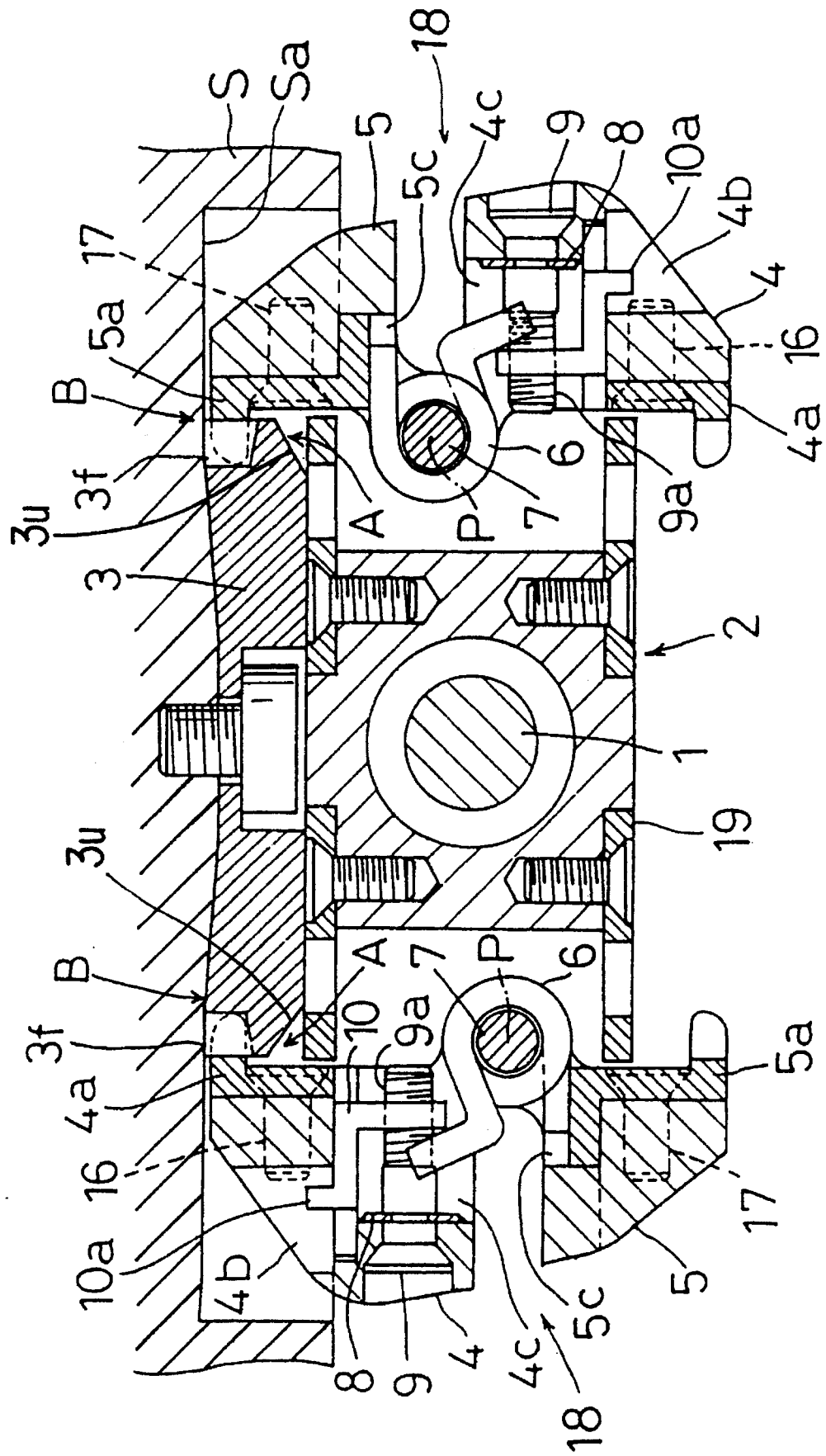

In FIGS. 1 through 3, numeral 1 denotes a pedal shaft attached to a free end of a crank arm of a bicycle crank, and numeral 2 denotes a pedal body rotatably supported by the pedal shaft 1. The pedal body 2 includes connecting means for rotatably connecting the pedal to the pedal shaft 1, and thus to the bicycle crank. The connecting means is arranged such that the pedal rotates about a first axis with respect to the crank. Two types of hooks 4 and 5 are pivotably supported by the pedal body 2, more particularly by each of two pivotal axes 7 included in the pedal body 2, to engage and release a cleat 3 attached to a bottom of a shoe for fixing the shoe to the bicycle pedal. The hook 4 engages a front engaging portion 3a of the cleat 3, while the hook 5 engages a rear engaging portion 3a of the cleat 3. The two hooks 4 and 5 forming a vertical pair are pivotable on a pivotal point P provided by each of the forward and rearward pivotal shafts or axes 7, and the two pairs of hooks 4 and 5 are in fore and aft rotation symmetry. Each of the hooks 4 and 5 is formed of aluminum, with engaging elements 4a or 5a of steel secured thereto by a bolt 16 or 17 since certain strength is required at a position thereof which directly contacts the cleat 3. The cleat is bolted to the shoe bottom S through two slots 3' to be adjustable sideways. The engaging portions 3a of the cleat have inclined undersurfaces 3u, so that a pedal treading action of the cyclist causes pivotal movement of the hooks 4 and 5.

The hooks 4 and 5 have helical springs 6 for urging the hooks 4 and 5 to the engaging positions. Each of the helical springs 6 is mounted on each pivotal axis supporting the vertical pair of hooks 4 and 5, such that the helical spring 6 is out of contact with intermediate recesses 4c and 5c defined in the hooks 4 and 5. Each helical spring 6 has an end thereof contacting a deformed nut 10 meshed with a threaded portion 9a of an adjusting bolt 9 positioned and rotatably supported through a washer-like element 8 in a center position adjacent the pivotal connection of the hook 4 for engaging the front end of the cleat 3. The position of the deformed nut 10 is adjustable by rotating the adjusting bolt 9. The other end of the helical spring 6 is in contact with the hook 5 for engaging the rear end of the cleat 3, more particularly with the engaging element 5a attached to the hook 5. Thus, each helical spring has one end extending to the hook 4 for engaging the front end of the cleat 3, and the other end extending to the hook 5 for engaging the rear end of the cleat 3, to urge the hooks 4 and 5 to the engaging positions, with its urging force adjustable by the adjusting bolt 9. The hook 4 for engaging the front end of the cleat 3 includes a window 4b in a transversely intermediate position thereof for allowing a visual confirmation of the position of the deformed nut 10 meshed with the adjusting bolt 9. The deformed nut 10 is bent at a position thereof adjacent an outer profile of the pedal to extend along the adjusting bolt 9, with an end face 10a thereof serving the purpose of visual confirmation through the window 4b. The position of the deformed nut 10 is confirmed by seeing this end face 10a through the window, thereby to check the urging condition of the helical spring 6. When the cleat 3 is moved toward the pedal body 2 for engagement, the hooks 4 and 5 once pivot toward the release positions against the force of the helical spring 6. Numeral 19 denotes a cleat rest with contact plates for contacting the cleat 3, each of which is attached to the pedal body 2 with a projection of the pedal body 2 fitted in a perforation formed centrally of the contact plate 19.

Figure 6:
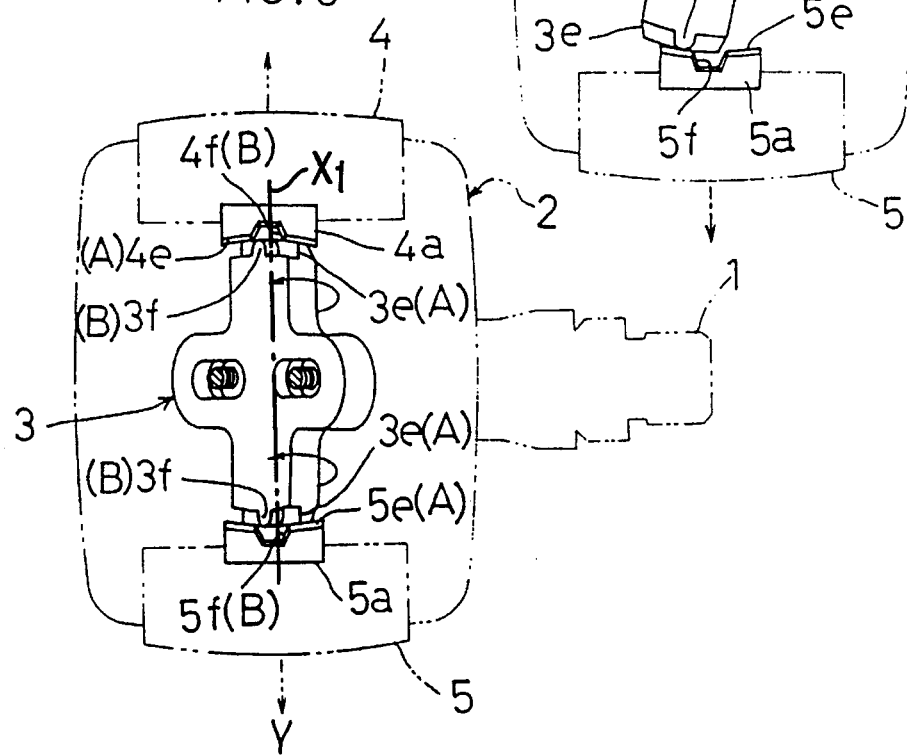

A first cam mechanism A is provided between each of the hooks 4 and 5 and the cleat 8, more particularly between each of the engaging portions of elements 4a and 5a of the hooks 4 and 5 and each of the engaging portions 3a of the cleat. The cam mechanisms A cause the hooks 4 and 5 to pivot toward the release positions when the cleat 3 is inclined, as shown in FIG. 6, about a first imaginary axis $X_1$ extending along the direction of pivotal movement of the hooks 4 and 5.

Figure 4:
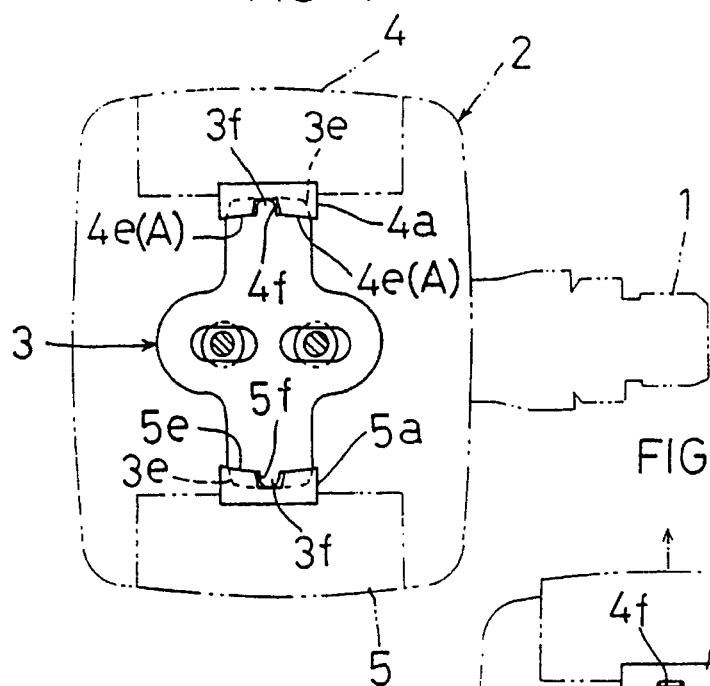
Figure 5:
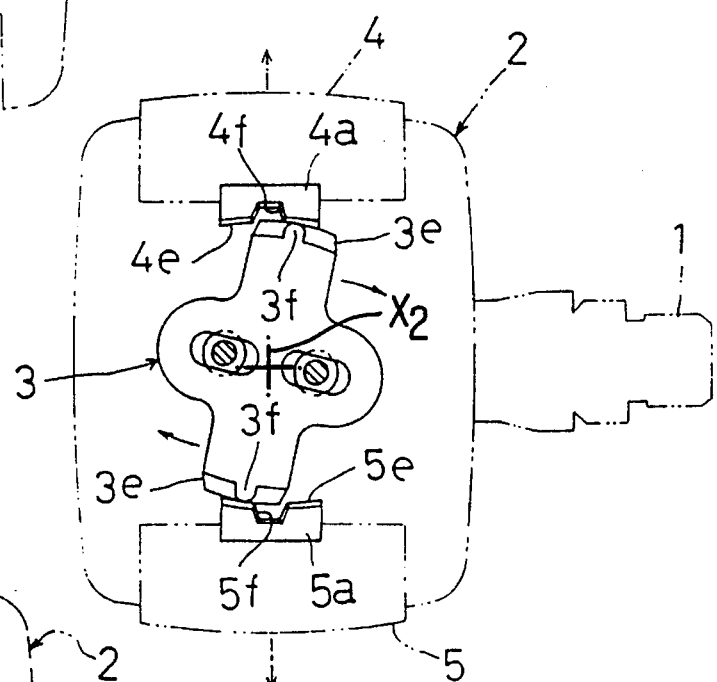

Each of the first cam mechanisms A includes a first pressed edge or hooking edge 4e or 5e (which is pressed when the shoe is released) formed linearly on a position of the hook 4 or 5 opposed to the cleat 3, and a first pressing cleat edge 3e (which applies a pressing force when the shoe is released) formed in a bent shape (which may be curved though not shown) under a position of the cleat 3 opposed to the hook 4 or 5 for slidable contact with the first pressed edge 4e or 5e. As shown in FIG. 4 which is seen in the direction perpendicular to a tread face of the pedal body 2, the first pressed edge 4e or 5e and the first pressing edge 3e, when engaged, overlap each other.

Further, a second cam mechanism B is provided between each of the hooks 4 and 5 and the cleat 3, more particularly between each of the engaging elements 4a and 5a of the hooks 4 and 5 and each of the engaging portions 3a of the cleat. The cam mechanisms B cause the hooks 4 and 5 to pivot toward the release positions when the cleat 3 is inclined about a second imaginary axis $X_2$ extending substantially perpendicular to the tread of the pedal body 2.

Each of the second cam mechanisms B includes a second pressed edge or hook contact portion 4f or 5f formed in a bent shape on a position of the hook 4 or 5 opposed to the cleat 3, and a second pressing edge or cleat contact portion 3f projecting from an upper position of the cleat 3 opposed to the hook 4 or 5 for slidable contact with the second pressed edge 4f or 5f. The pressed edge 4e or 5e of the hook 4 or 5 lies in a locus described by the second pressing edge 3f when the cleat 3 is turned (from the position shown in FIG. 4 to the position shown in FIG. 5).

As described above, the connecting structure between the bicycle pedal and cleat according to the present invention includes the cam mechanisms A each having the first pressed edge 4e or 5e of the hook 4 or 5 and the first pressing edge 3e of the cleat 3 overlapping each other when seen in the direction perpendicular to the tread of the pedal body 2. When the cleat 3 is inclined about the first imaginary axis extending along the direction of pivotal movement of the hooks 4 and 5, the cam mechanisms A cause the hooks 4 and 5 to pivot toward the release positions, thereby releasing the shoe with the cleat 3 fixed thereto from the pedal.

This connecting structure also includes the second cam mechanisms B for causing the hooks 4 and 5 to pivot toward the release positions when the cleat 3 is inclined about the second imaginary axis extending substantially perpendicular to the tread of the pedal body 2. Thus, when the cleat 3 is turned about this axis, the cam mechanisms B cause the hooks 4 and 5 to pivot toward the release positions, thereby releasing the shoe with the cleat 3 fixed thereto from the pedal.

Figure 7:
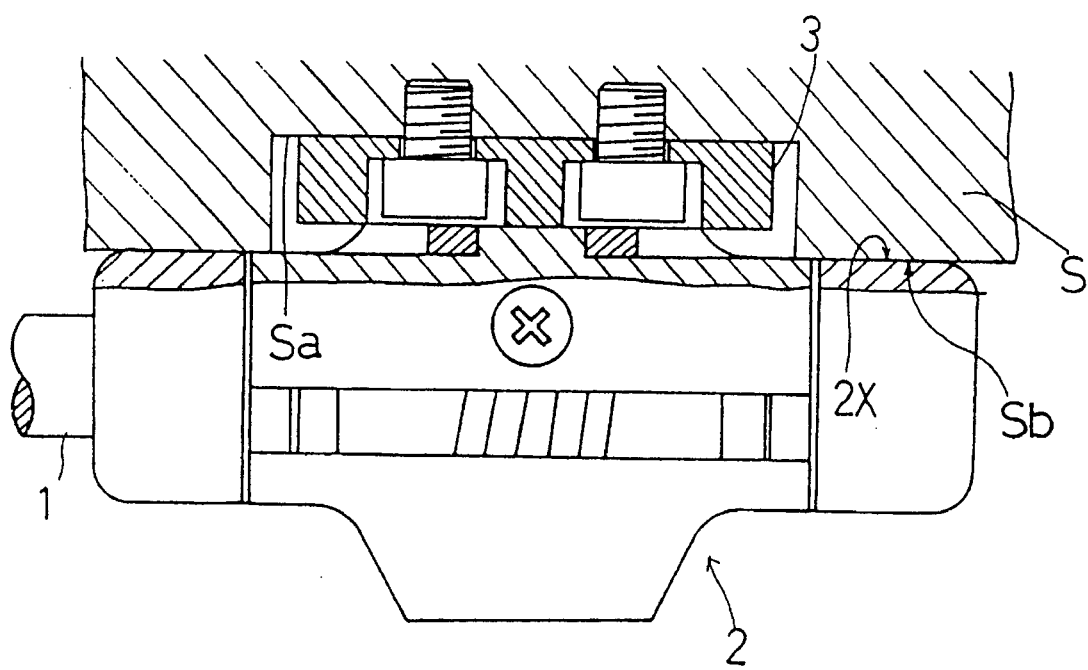
Figure 8:
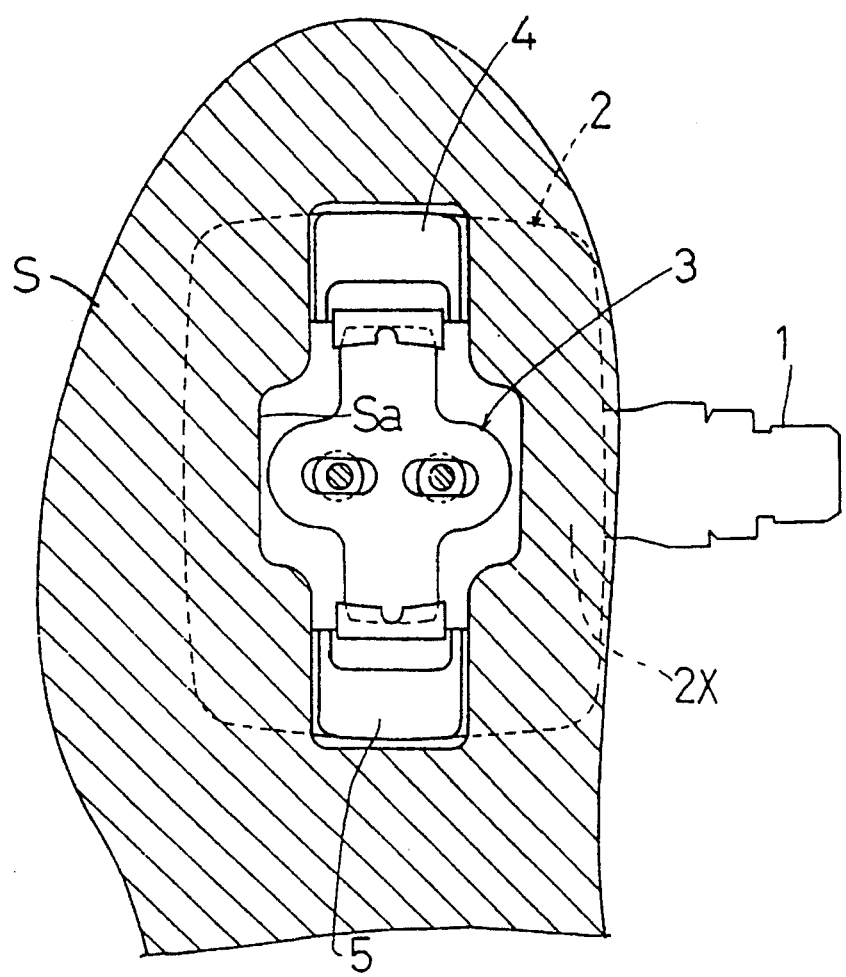

As shown in FIGS. 1, 7 and 8, the pedal body 2 includes a shoe rest (with inner and outer pedal surfaces) 2X formed of an elastic material for receiving the shoe bottom S. This shoe rest 2X surrounds a cleat connecting device including the hooks 4 and 5, helical springs 6 and pivotal axes 7. The shoe includes a contact portion Sb formed around the cleat 3 for contacting the shoe rest 2X of the bicycle pedal. When the shoe bottom S is connected to the connecting device 18, the shoe rest 2X receives the contact portion Sb of the shoe bottom S. This construction transmits part of the treading force of the cyclist from the contact portion Sb of the shoe bottom S directly to the pedal body 2, and at the same time the elasticity of the shoe bottom S absorbs vibrations due to roughness of the terrain transmitted as a reaction to the treading force from the pedal body 2 to the cyclist's foot, thereby reducing the strain of the cyclist's foot.

The shoe bottom S includes a recess Sa with bolt holes formed in the bottom of this recess Sa, and the cleat 3 is removably bolted to the shoe bottom S. When the cleat 3 is not used, the cleat 3 is removed from the shoe bottom S and a solid filling material is fitted into the recess Sa and fixed in position by an adhesive, for example. Then the shoe becomes an ordinary walking shoe. According to the described construction, the cleat 3 acts primarily to connect the shoe to the pedal, and the treading force is transmitted from the contact portion Sb of the shoe bottom S and the shoe rest 2X. This construction allows the cleat 3 to be compact, and therefore a cutout need not be defined in the shoe as in the prior art. Since the cleat 3 is surrounded entirely by the shoe bottom S, the cyclist can stably place his foot on the ground.

A second embodiment of the present invention will be described next with reference to FIGS. 9 through 13. This embodiment is similar in construction to the preceding embodiment except the cleat and the cleat contact plates.

Figure 9:
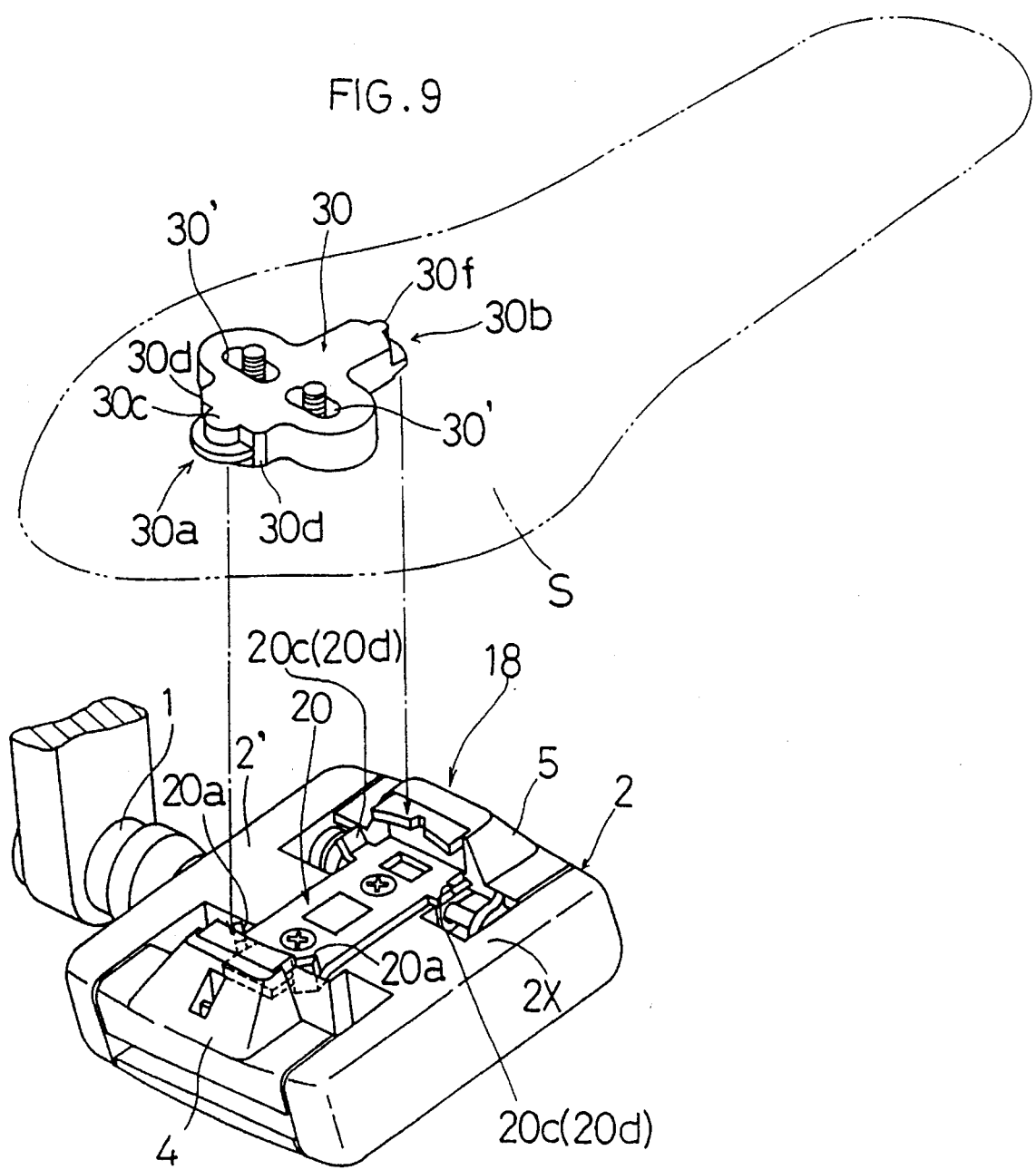

As shown in FIG. 9, a cleat 30 includes a front engaging portion 30a and a rear engaging portion 30b for engagement with the hooks (first and second cleat retaining means) 4 and 5, respectively. The front engaging portion 30a has a semicircular top 30c of a half cylinder projecting from a top surface thereof. The rear engaging portion 30b defines a second pressing edge 30f projecting upwardly. The front engaging portion 30a defines oblique contact portions 30d at opposite sides thereof for contacting forward movement stoppers 20a to be described hereunder.

Figure 10:
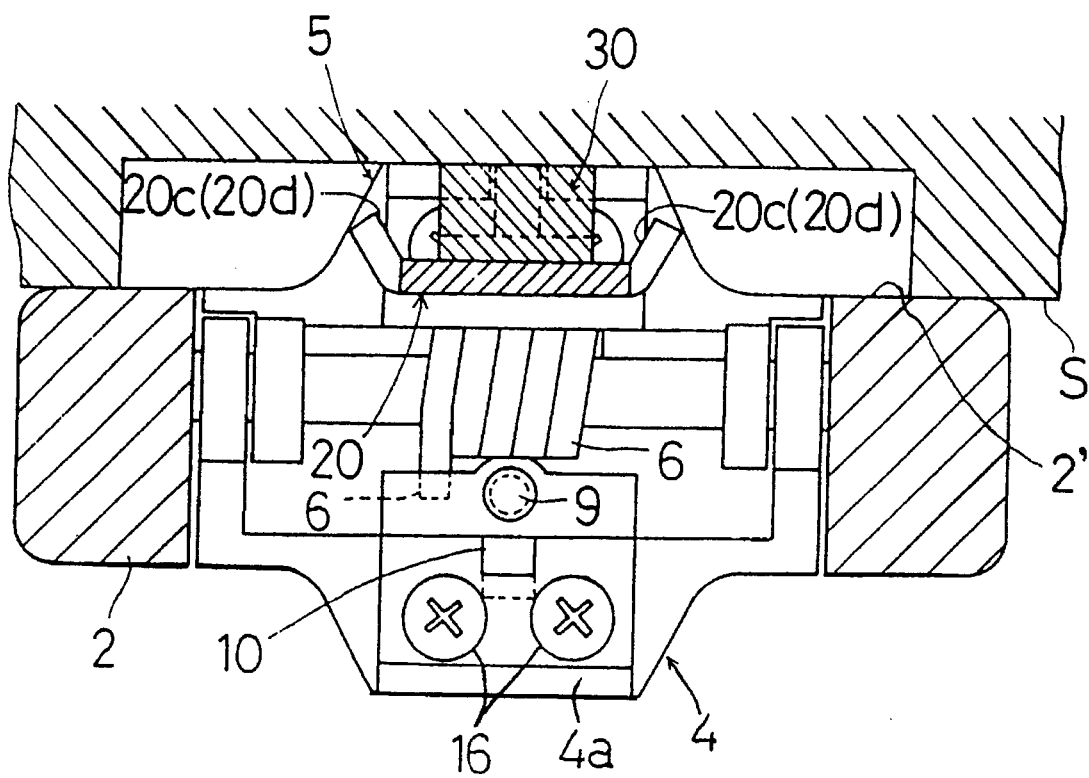
Figure 13:
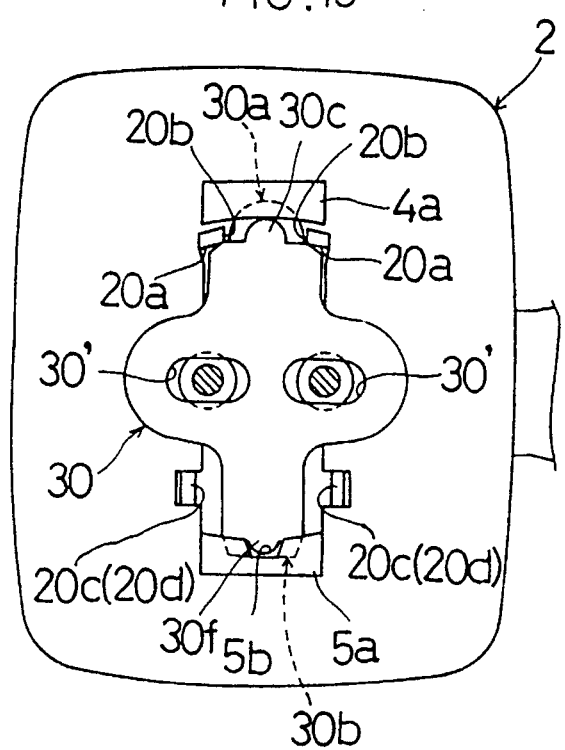

As shown in FIGS. 9, 10 and 13, a cleat contact plate (base) 20 formed of steel has right and left front corners bent upward. Each of these upwardly bent portions defines an oblique forward movement stopper 20a for contacting the contact portion 30d of the cleat 30, and a rotation restrictor 20b for contacting a side of the front engaging portion 30a. Further, the cleat contact place 20 has right and left rear portions bent upward. Each of these upwardly bent portions defines a rear rotation restrictor or guide element 20c for contacting a side of the cleat 30. The two rear rotation restrictors 20c are inclined in a way to diverge upwardly away from a tread 2' of the pedal body 2, thereby defining cam or guide surfaces 20d. When the cleat 30 is engaged by the hooks 4 and 5, as shown in FIG. 13, the front rotation restrictors 20b contact the opposite sides at the front end of the cleat 30 to prevent lateral movement of the front end of the cleat 30, and the forward movement stoppers 20a contact the oblique contact portions 30d of the cleat 30 to prevent forward movement of the cleat 30. The rear end of the cleat 30, by the action of the cam surfaces 20d, remains away from the tread 2' of the pedal body 2 in the absence of a treading force. When a treading force is applied, the cam surfaces 20d act as the rear rotation restrictors 20c to prevent lateral movement of the rear end of the cleat 30. Consequently, the rotation of the cleat 30 about the second imaginary axis X is prevented mainly when a treading force is applied.

The way in which the connecting structure between the bicycle pedal body 2 and cleat 30 behaves will be described next.

As shown in FIG. 9, when the cleat 30 attached to the shoe bottom S is pressed down on one of the treads 2' of the pedal body 2, the hooks 4 and 5 pivot in directions away from the pedal body 2 through contact with the inclined surfaces formed under the engaging portions 30a and 30b. Thereafter the hooks 4 and 5 pivot in directions toward the pedal body 2 and engage the engaging portions 30a and 30b, respectively. This completes the connection between the shoe and pedal body 2 as shown in FIGS. 10, 4 and 13. Since both of the hooks 4 and 5 pivot at this time, the treading action with respect to the pedal body 2 may be carried out in a direction substantially perpendicular to the tread 2' of the pedal body 2. In addition, the rear end of the cleat 30 is guided to a correct position by the cam surfaces 20d, so that the cyclist may pay little attention to the treading position relative to the pedal body 2.

Figure 11:
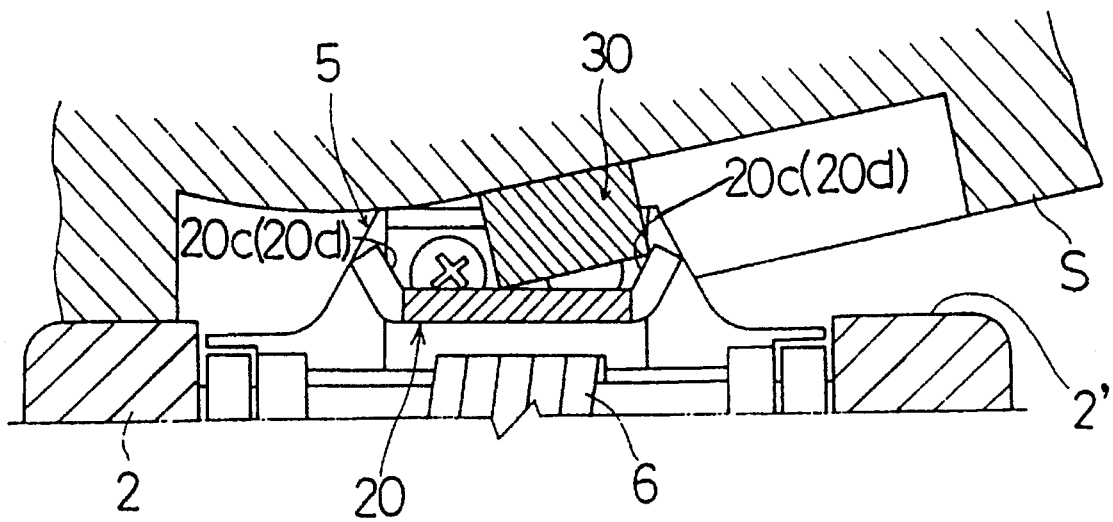
Figure 12:
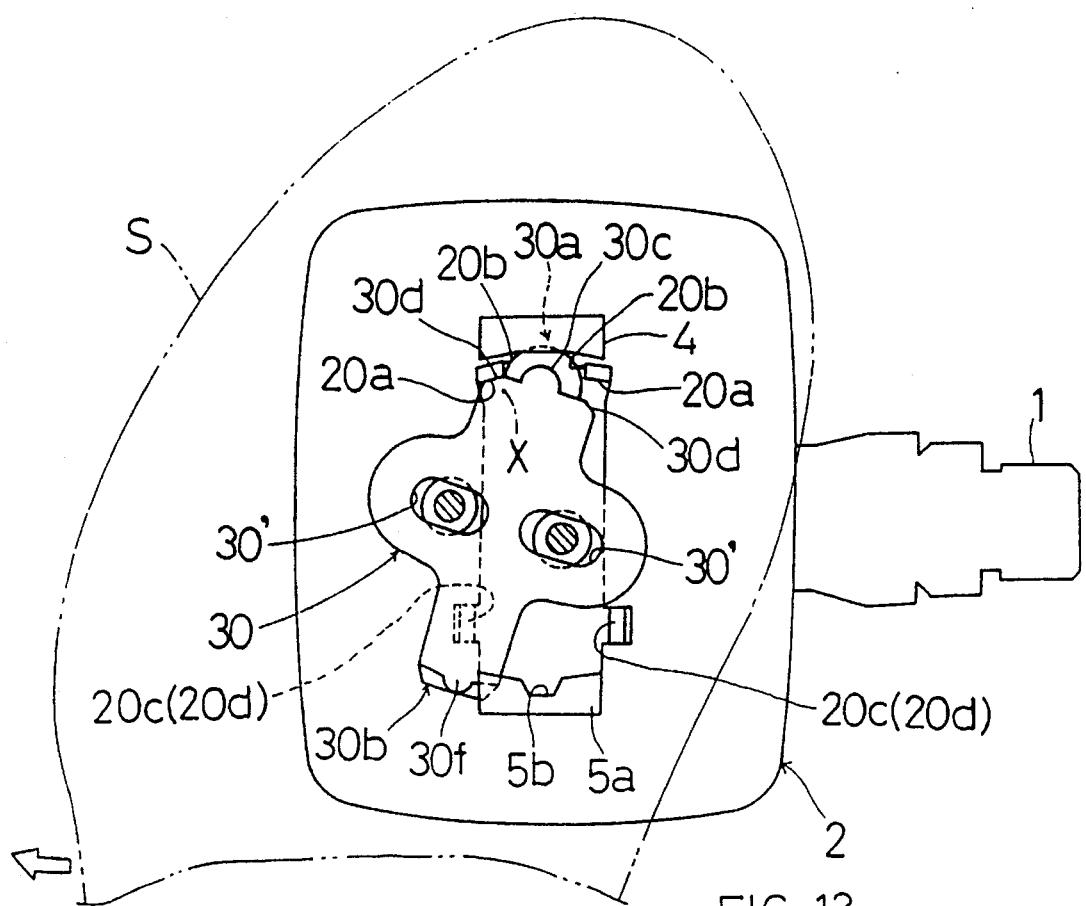

For disconnecting the shoe from the pedal body 2, the cleat may just be turned about the second imaginary axis X as shown in FIGS. 11 and 12, with no treading force applied to the rear end of the cleat 30. At this time, the front end of the cleat 30 is restrained from lateral movement by the front rotation restrictors 20b, so that the second imaginary axis X extends through a position adjacent the front rotation restrictors 20b. The rear hook 5 pivots rearwardly through a relative sliding movement between the second pressing edge 30f at the rear end of the cleat 30 and a cam surface 5b of the rear hook 5. The cleat 30 is thereby disengaged from the hooks 4 and 5 to complete disconnection between the shoe and the pedal body 2. In this way, the cyclist can positively select connection or disconnection of the cleat 30 or shoe to/from the pedal body 2 according to circumstances.

In an emergency, such as when the cyclist falls over, the treading force is at least temporarily removed from the pedal body 2. The cleat 30 may become disengaged from the pedal body 2 through a behavior similar to the intentional operation described above, thereby to secure safety of the cyclist. In this case, the rear end of the cleat moves away from the tread 2' of the pedal body 2 under the guiding action of the cam surfaces 20d. The cleat 30 becomes disengaged from and moves away from the rear hook 5, so that inadvertent re-engagement between the cleat 30 and the rear hook 5 is positively avoided.

Modifications of the first embodiment will be set out hereunder.

Figure 14:
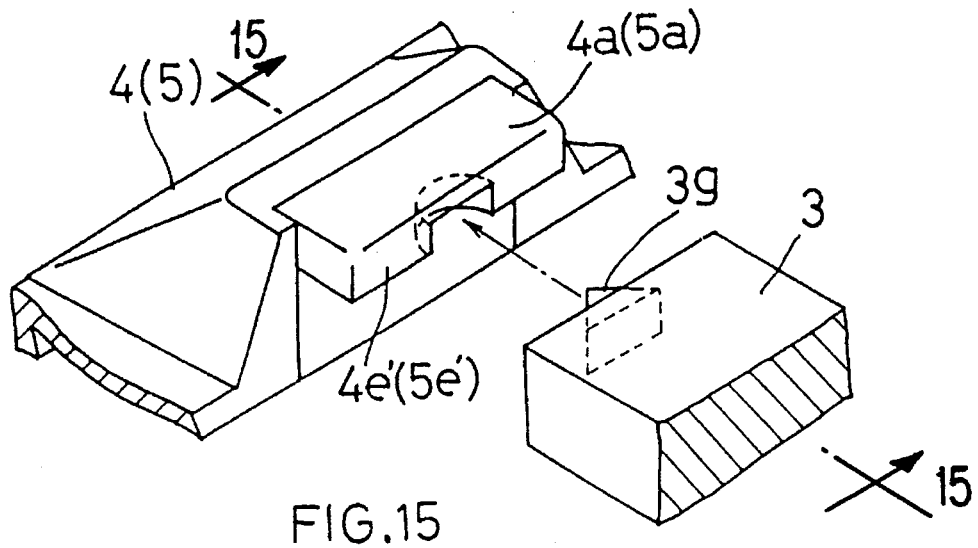
FIG. 14 is a perspective view of a modification made to the first embodiment.
Figure 15:
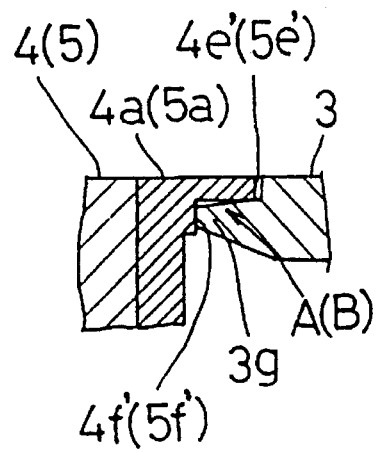
FIG. 15 is a sectional view of a principal portion of the modification shown in FIG. 14, taken along the line 15—15 of FIG. 14.

1. As shown in FIGS. 14 and 15, the first and second pressing edges of the cleat 3 may be in the form of one pressing portion 3g of the cleat 3. The pressing portion 3g acts as a first cam mechanism A in combination with a first pressed edge 4e' or 5e' of the hook 4 or 5, and as a second cam mechanism B in combination with a second pressed edge 4f or 5f of the hook 4 or 5. Further, it is possible to provide the first cam mechanisms A only.

Figure 16:
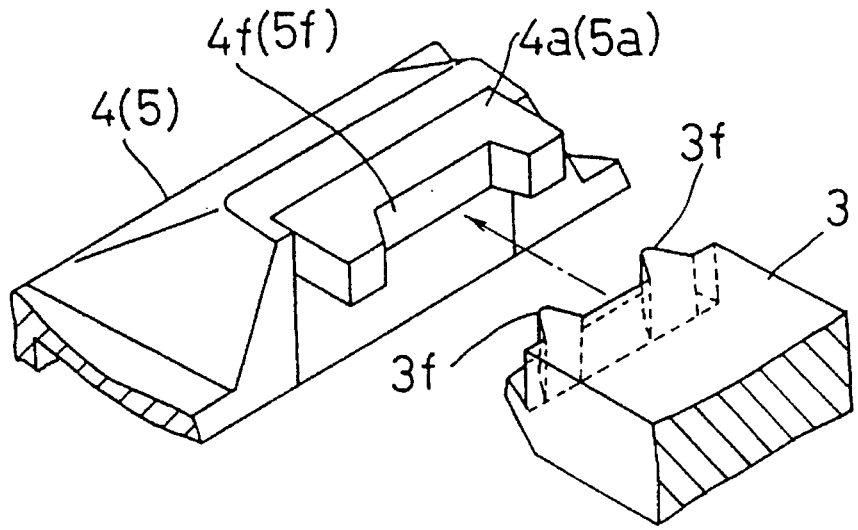
FIG. 16 is a perspective view of another modification made to the first embodiment.

2. The second pressing edge 3f and the second pressed edge 4f or 5f may be reversed as to the projection/recess relationship. Further, as shown in FIG. 16, the second pressing edge 3f may include two projections.

3. The pair of hooks 4 and 5 may be provided only on one face of the pedal body 2 instead of both faces thereof.

4. The specific construction of the connecting device 18 may be varied as desired. For example, the cleat 3 may be engaged at the front end by a stationary member, the rear end of the cleat 3 being clamped at right and left by hooks.

5. The shape and size of the shoe rest 2X are variable with the connecting device 18. Where the connecting device 18 is elongated axially of the pedal shaft 1, the shoe rest 2X may be split fore and aft across the connecting device 18. In other words, the shoe rest 2X will serve the purpose as long as it is positioned around the connecting device 18. The shoe rest 2X may partly or entirely surround the connecting device 18.

Modifications of the second embodiment will be described next.

Figure 17:
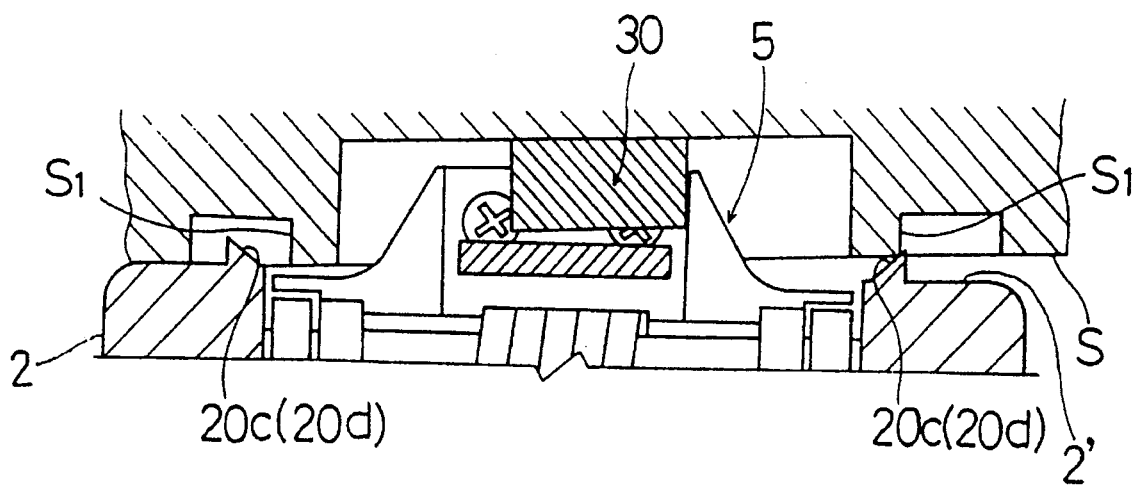
FIGS. 17 and 18 are views showing modifications made to the second embodiment.

6. In the second embodiment, the rear rotation restrictors 20c and cam surfaces 20d are arranged to contact the cleat 80. However, these components may be adapted to contact the shoe bottom S. As shown in FIG. 17, for example, the pedal body 2 may include projections formed on each tread thereof and defining the rear rotation restrictors 20c acting as cam surfaces 20d, the rear rotation restrictors 20c being arranged to contact surfaces F2 in holes defined in the shoe bottom S. The shoe bottom S is restrained from rotation about the second imaginary axis X by the contact between the rear rotation restrictors 20c and the surfaces F2. The shoe bottom S and cleat 30 are movable away from the tread 2' of the pedal body 2 with rotation about the second imaginary axis X of the shoe bottom S.

Figure 18:
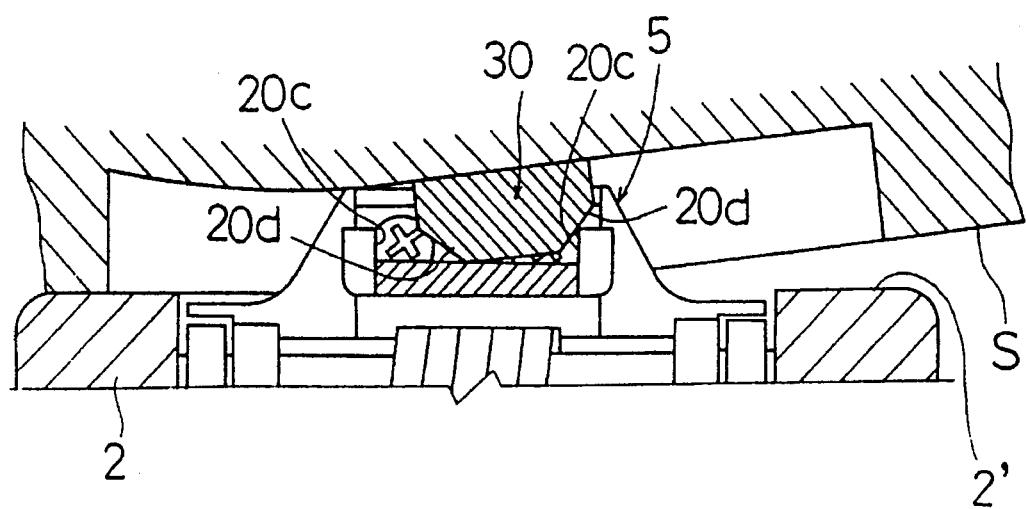
Figure 19:
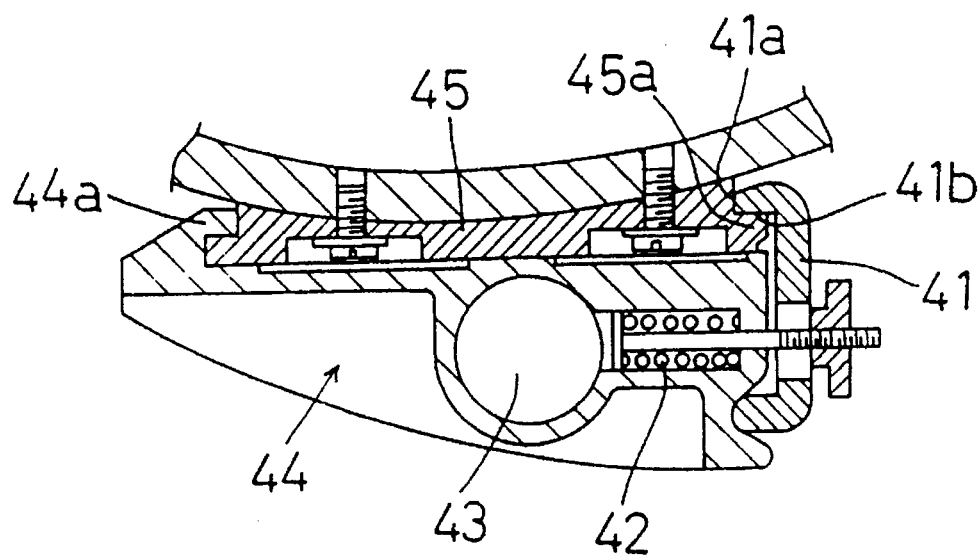
FIG. 19 is a view in vertical section of a conventional connecting structure between a bicycle pedal and a cleat, taken along the line 19—19 of FIG. 20.
Figure 20:
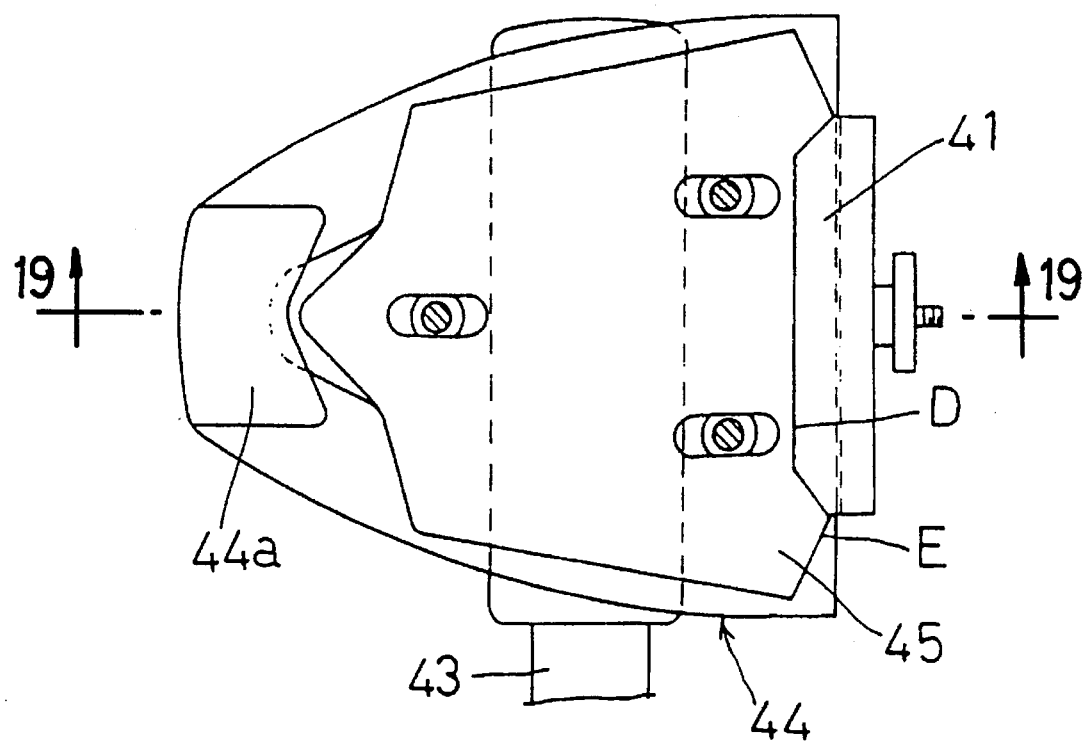
FIG. 20 is a plan view of the conventional connecting structure shown in FIG. 19.

7. While the cam surfaces 20d are provided on the rear rotation restrictors 20c in the second embodiment and modification 6 above, the cam surfaces 20d may be formed on the cleat 30 or shoe bottom S only or may by formed on the cleat 30 or shoe bottom S as well as the rear rotation restrictors 20c. As shown in FIG. 18, For example, the rear rotation restrictors 20c may extend substantially perpendicular to the tread 2' of the pedal body 2, with the cleat 30 defining cam surfaces 20d at opposite sides at rear positions thereof which are inclined to converge downwardly. This construction corresponds to the second embodiment in function and effect.

8. While the cam surfaces 20d are provided on the rear rotation restrictors 20c in the second embodiment, the cam surfaces 20d may be formed on the front rotation restrictors 20b only or may be formed on both the front rotation restrictors 20b and the rear rotation restrictors 20c. In the former the second imaginary axis X is located rearwardly of the cleat 30, while in the latter the position of axis X variable with the way a couple of forces is applied to the cleat 30. In the former case, the relationship between the semicircular top 30c and the second pressing edge 3f and second pressed edge 5f may be reversed fore and aft from their relationship in the second embodiment.

9. While, in the second embodiment, both of the hooks 4 and 5 are pivotable, only one of them may be constructed pivotable and the other formed integral with the pedal body.

10. In the second embodiment, the front and rear rotation restrictors 20b and 20c are distributed right and left of the pedal body 2. However, the rotation restrictors may be provided only at one front position and one rear position of the pedal body 2. Further, the rotation restrictors 20c and 20d may be provided centrally of the pedal body 2 instead of the two positions at the front and rear thereof. Also only one cam surface may be provided on the pedal body 2 instead of two.

11. While, in the second embodiment, the forward movement stoppers 20a are provided in the forward portions of the pedal body 2, these may be provided centrally or rearwardly of the pedal body 2. The two forward movement stoppers 20a may be replaced by one forward movement stopper for contacting the entire front end of the cleat 30. This construction corresponds to the second embodiment in function and effect.

What is claimed is:

1. A pedal for engaging a cleat having a front engaging portion and a rear engaging portion, said pedal comprising:

a first hook for engaging said front engaging portion of said cleat;

a second hook for engaging said rear engaging portion of said cleat; and a cleat opposing plate, said cleat opposing plate being located in a plane; and wherein said second hook is pivoted from a cleat engaging position to a cleat disengaging position by rotating said cleat about an axis of rotation, with said axis of rotation being perpendicular to said plane; and wherein said cleat opposing plate includes a pair of stopper projections for causing said cleat to rotate about said axis of rotation, said stopper projections being formed by bending portions of said cleat opposing plate in a direction parallel to said axis of rotation, said stopper projections being located adjacent to said first hook, said axis of rotation being located adjacent to said stopper projections, said stopper projections being spaced apart from each other such that said front engaging portion is located between said projections when said front engaging portion is engaged with said first hook, and wherein the distance between said stopper projections increases with increasing distance from said first hook.

2. A pedal arranged to be connected to a bicycle shoe having an elastic shoe bottom (Sb) and a recess (Sa) for receiving a cleat (3), said pedal comprising:

connecting means for rotatably connecting said pedal to a bicycle crank, such that said pedal is arranged to rotate about a first axis with respect to said crank;

a cleat opposing face for opposing said cleat;

first and second hooks each having an engaging portion for engaging said cleat, said first and second hooks being located at fore and aft positions of said pedal, such that said connecting means is located between said first and second hooks, said first hook being pivoted about a second axis between an engaging position and a disengaging position, said second axis being parallel to said first axis; and inner and outer shoe bottom rests (2x) for supporting said shoe bottom, said shoe bottom rests being formed separately from said cleat opposing face, said shoe bottom rests being spaced apart from said cleat opposing face.

3. A bicycle pedal comprising:

connecting means for rotatably connecting said pedal to a bicycle crank;

first cleat retaining means, second cleat retaining means, and a cleat opposing face provided between said first and second cleat retaining means, said first and second cleat retaining means being located at fore and aft positions of said pedal, such that said connecting means is located between said first and second cleat retaining means, said first and second cleat retaining means being formed separate from said cleat opposing face, with at least one of said retaining means being pivoted about an axis and being urged in a retaining direction, said one of said retaining means being movably supported with respect to said cleat opposing face; and shoe bottom rests (2X) for receiving a shoe bottom, wherein said first and second cleat retaining means are at least partially surrounded by said shoe bottom rests, said shoe bottom rests being formed separately from said cleat opposing face.

4. A pedal arranged to be connected to a bicycle shoe having a shoe bottom and a recess for receiving a cleat, said pedal comprising:

connecting means for rotatably connecting said pedal to a bicycle crank, such that said pedal is arranged to rotate about a first axis with respect to said crank;

a cleat opposing face for opposing said cleat;

first and second hooks each having an engaging portion for engaging said cleat, said first and second hooks being located at fore and aft positions of said pedal, such that said connecting means is located between said first and second hooks, said first hook being arranged to be pivoted about a second axis between an engaging position and a disengaging position, said second axis being parallel to said first axis; and inner and outer pedal surfaces for opposing said shoe bottom, said pedal surfaces being formed separately from said cleat opposing face, said pedal surfaces being spaced apart from said cleat opposing face.

5. A bicycle pedal comprising:

connecting means for rotatably connecting said pedal to a bicycle crank;

first cleat retaining means, second cleat retaining means, and a cleat opposing face provided between said first and second cleat retaining means, said first and second cleat retaining means being located at fore and aft positions of said pedal, such that said connecting means is located between said first and second cleat retaining means, said first and second cleat retaining means being formed separate from said cleat opposing face, and with at least one of said retaining means being arranged to be pivoted about an axis and being urged in a retaining direction, said one of said retaining means being movably supported with respect to said cleat opposing face; and pedal surfaces for opposing a shoe bottom, wherein said first and second cleat retaining means are at least partially surrounded by said pedal surfaces, said pedal surfaces being formed separately from said cleat opposing face.

6. A pedal arranged to be connected to a bicycle shoe having an elastic shoe bottom (Sb) and a recess (Sa) for receiving a cleat (3), said pedal comprising:

connecting means for rotatably connecting said pedal to a bicycle crank, such that said pedal is arranged to rotate about a first axis with respect to said crank;

a cleat opposing face for opposing said cleat;

first and second hooks each having an engaging portion for engaging said cleat, said first and second hooks being located at fore and aft positions of said pedal, such that said connecting means is located between said first and second hooks, said first hook being arranged to be pivoted about a second axis between an engaging position and a disengaging position, said second axis being parallel to said first axis; and inner and outer shoe bottom rests (2X) forming an upper surface of said pedal, said shoe bottom rests being formed separately from said cleat opposing face, said shoe bottom rests being spaced apart from said cleat opposing face.

7. A pedal arranged to be connected to a bicycle shoe having an elastic shoe bottom (Sb) and a recess (Sa) for receiving a cleat (3), said pedal comprising:

connecting means for rotatably connecting said pedal to a bicycle crank, such that said pedal is arranged to rotate about a first axis with respect to said crank;

a cleat opposing face for opposing said cleat;

first and second hooks each having an engaging portion for engaging said cleat, said first and second hooks being located at fore and aft positions of said pedal, such that said connecting means is located between said first and second hooks, said first hook being arranged to be pivoted about a second axis between an engaging position and a disengaging position, said second axis being parallel to said first axis; and inner and outer shoe bottom rests (2X), said shoe bottom rests being formed separately from said cleat opposing face, said shoe bottom rests being spaced apart from said cleat opposing face.

8. A bicycle pedal comprising:

connecting means for rotatably connecting said pedal to a bicycle crank;

first and second cleat retaining means for retaining a cleat, said first and second cleat retaining means being located at fore and aft positions of said pedal, such that said connecting means is located between said first and second cleat retaining means;

a base provided between said first and second cleat retaining means, said base being formed separate from said first and second cleat retaining means;

wherein at least one of said first or second cleat retaining means is arranged to be pivoted about an axis and includes urging means for urging said at least one of said first or second cleat retaining means in a retaining direction, with said one of said first or second retaining means being movably supported with respect to said base; and inner and outer shoe bottom rests (2X), said shoe bottom rests being formed separately from said base, said shoe bottom rests being spaced apart from said base.

9. A pedal for engaging a cleat having a front engaging portion and a rear engaging portion, said pedal comprising:

a first hook for engaging said front engaging portion of said cleat;

a second hook for engaging said rear engaging portion of said cleat; and a cleat opposing plate, said cleat opposing plate having a cleat opposing face to be opposed to said cleat, said plate being located in a plane; and wherein said second hook is pivoted from a cleat engaging position to a cleat disengaging position by rotating said cleat about an axis of rotation, with said axis of rotation being perpendicular to said plane; and wherein said cleat opposing plate includes a pair of stopper projections for causing said cleat to rotate about said axis of rotation, said stopper projections being formed by bending portions of said cleat opposing plate in a direction parallel to said axis of rotation, said stopper projections being located adjacent to said first hook, said axis of rotation being located adjacent to said stopper projections, said stopper projections being spaced apart from each other, said stopper projections being located such that a part of said front engaging portion of said cleat projected forwardly from the space between said stopper projections is engaged with said first hook when said front engaging portion is engaged with said first hook; and wherein the distance between said stopper projections increases with increasing distance from said first hook.

* * * * *